United States Patent
Hansson et al.

(10) Patent No.: US 9,727,360 B2
(45) Date of Patent: Aug. 8, 2017

(54) OPTIMIZING VIRTUAL GRAPHICS PROCESSING UNIT UTILIZATION

(75) Inventors: Nils P. Hansson, Monroe, WA (US); Edward S. Suffern, Chapel Hill, NC (US); James L. Wooldridge, Fall City, WA (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 13/523,003

(22) Filed: Jun. 14, 2012

(65) Prior Publication Data

US 2012/0254868 A1    Oct. 4, 2012

Related U.S. Application Data

(63) Continuation of application No. 12/885,132, filed on Sep. 17, 2010.

(51) Int. Cl.
*G06F 9/455* (2006.01)
*G06F 3/14* (2006.01)
(Continued)

(52) U.S. Cl.
CPC ............ *G06F 9/45558* (2013.01); *G06T 1/20* (2013.01); *G06F 3/1454* (2013.01);
(Continued)

(58) Field of Classification Search
CPC .... G06F 3/0662; G06F 3/0664; G06F 3/0665; G06F 12/00; G06F 12/02; G06F 9/455;
(Continued)

(56) References Cited

U.S. PATENT DOCUMENTS 5,530,860 A * 6/1996 Matsuura .............. G06F 9/5027
                                                       718/105
7,667,709 B2   2/2010 Zimmer
(Continued)

FOREIGN PATENT DOCUMENTS

CN   101488098 A   7/2009

OTHER PUBLICATIONS

Garfinkel et al., "Terra: A virtual machine-based platform for trusted computing." ACM SIGOPS Operating Systems Review. vol. 37. No. 5. ACM, 2003.*

(Continued)

*Primary Examiner* — Ulka Chauhan
*Assistant Examiner* — Sae Won Yoon
(74) *Attorney, Agent, or Firm* — Brandon C. Kennedy; Jason A. Friday; Kennedy Lenart Spraggins LLP

(57) ABSTRACT

Methods, systems, and computer program products are provided for optimizing virtual graphics processing unit utilization. Embodiments include assigning a computing intensity level to each virtual machine of a plurality of virtual machines; assigning a priority level to each virtual machine of the plurality of virtual machines; determining for each server of a plurality of servers whether the server includes a virtual graphics processing unit (VGPU) that is available to perform compute intensive tasks for the plurality of virtual machines; and assigning one or more VGPUs to a virtual machine of the plurality of virtual machines in dependence upon the computing intensity level and the priority level of the virtual machine and the number of VGPUs available to perform the compute intensive tasks.

8 Claims, 3 Drawing Sheets

(51) Int. Cl.
*G06T 1/20* (2006.01)
*G09G 5/36* (2006.01)
*G06T 3/40* (2006.01)

(52) U.S. Cl.
CPC ..... *G06F 2009/4557* (2013.01); *G09G 5/363* (2013.01); *G09G 2370/022* (2013.01)

(58) Field of Classification Search
CPC ............ G06F 9/45533; G06F 9/45537; G06F 9/4881; G06F 9/5011; G06F 9/505; G06F 9/5077; G06F 9/5083; G06F 9/5088
USPC .................................. 345/501; 718/102–105
See application file for complete search history.

(56) References Cited

U.S. PATENT DOCUMENTS

| | | | | |
|---|---|---|---|---|
| 8,141,090 | B1* | 3/2012 | Graupner | G06F 9/45558 709/225 |
| 8,165,108 | B1 | 4/2012 | Mouilleron et al. | |
| 8,255,915 | B1 | 8/2012 | Blanding et al. | |
| 8,516,478 | B1* | 8/2013 | Edwards | G06F 9/505 709/201 |
| 9,311,125 | B2* | 4/2016 | Mo | G06F 9/45537 |
| 2004/0003077 | A1* | 1/2004 | Bantz | G06F 9/5072 709/224 |
| 2005/0188361 | A1* | 8/2005 | Cai et al. | 717/148 |
| 2006/0005188 | A1* | 1/2006 | Vega | G06F 9/5077 718/1 |
| 2006/0136913 | A1* | 6/2006 | Sameske | G06F 9/5044 718/1 |
| 2006/0146057 | A1* | 7/2006 | Blythe | 345/506 |
| 2007/0006218 | A1* | 1/2007 | Vinberg | G06F 8/61 717/174 |
| 2007/0043860 | A1* | 2/2007 | Pabari | G06F 9/5072 709/224 |
| 2007/0079308 | A1* | 4/2007 | Chiaramonte et al. | 718/1 |
| 2007/0094367 | A1* | 4/2007 | Esfahany et al. | 709/223 |
| 2007/0106992 | A1 | 5/2007 | Kitamura | |
| 2007/0192641 | A1* | 8/2007 | Nagendra et al. | 713/320 |
| 2007/0233838 | A1* | 10/2007 | Takamoto | G06F 9/5077 709/223 |
| 2008/0117217 | A1 | 5/2008 | Bakalash et al. | |
| 2008/0320269 | A1 | 12/2008 | Houlihan et al. | |
| 2009/0077552 | A1* | 3/2009 | Sekiguchi | G06F 9/45558 718/1 |
| 2009/0172666 | A1 | 7/2009 | Yahalom et al. | |
| 2009/0198766 | A1* | 8/2009 | Chen | G06F 9/45558 709/202 |
| 2009/0300210 | A1* | 12/2009 | Ferris | G06F 9/5077 709/235 |
| 2010/0013839 | A1 | 1/2010 | Rawson | |
| 2010/0115510 | A1* | 5/2010 | Ford et al. | 718/1 |
| 2010/0169253 | A1 | 7/2010 | Tan | |
| 2010/0169536 | A1* | 7/2010 | Shedel | G06F 9/45558 711/6 |
| 2010/0251234 | A1* | 9/2010 | Oshins | G06F 9/5077 718/1 |
| 2010/0281478 | A1* | 11/2010 | Sauls | G06F 9/5077 718/1 |
| 2010/0333100 | A1* | 12/2010 | Miyazaki | G06F 9/4881 718/103 |
| 2011/0271276 | A1* | 11/2011 | Ashok | G06F 9/5077 718/1 |
| 2012/0069032 | A1 | 3/2012 | Hansson et al. | |

OTHER PUBLICATIONS

Geys et al., "View Synthesis by the Parallel Use of GPU and CPU", Image and Vision Computing, Jul. 2007, pp. 1154-1164, vol. 25, No. 7, Elsevier B.V., USA.
Woo et al.; "Chameleon: Virtualizing Idle Acceleration Cores of a Heterogeneous Multicore Processor for Caching and Prefetching"; ACM Digital Library; Vo.7, No. 1, Art 3, 35 pp., Apr. 2010.
Wang et al.; "Sequencer Virtualization"; ACM Digital Library; pp. 148-160; Jun. 2007.
Final Office Action, U.S. Appl. No. 12/885,132, May 27, 2014, pp. 1-29.
Adler, et al. "Distributed Coordination Models for Client/Server Computing", Computer, vol. 28, Issue 4, Apr. 1995, pp. 15-22, IEEE Computer Society, USA.
Oehmke et al., "How to fake 1000 registers", INSPEC/IEEE Computer Society, Proceedings, 38th Annual IEEE/ACM International Symposium on Microarchitecture, Nov. 2005, 12 pages, IEEE Computer Society, Los Alamitos, CA, USA.
Kan et al., "Data Centric Distribution Control for Scalable and Efficient Cloud Platforms", IEICE Technical Committee on Data Engineering, DEIM Forum 2010, May 2010, 8 pages, The Institute of Electronics, Information and Communication Engineers (IEICE), Japan. (English abstract only).
Unknown, "Seeing and Understanding Cloud Magazine, Try Cloud Right Now", Amazon Elastic Compute Cloud (EC2), May 2010, pp. 11-21, Nikkei BP, Japan. (English abstract only).
Yuki, "A Resource Selection Method for Using Idle GPUs in Grid Environments", IPSJ SIG Technical Report, Oct. 2006, No. 2006(106), pp. 37-42, Information Processing Society of Japan, Japan. (English abstract only).

* cited by examiner

OPTIMIZING VIRTUAL GRAPHICS PROCESSING UNIT UTILIZATION

CROSS-REFERENCE TO RELATED APPLICATION

This application is a continuation application of and claims priority from U.S. patent application Ser. No. 12/885,132, filed on Sep. 17, 2010.

BACKGROUND OF THE INVENTION

1. Field of the Invention

The field of the invention is data processing, or, more specifically, methods, apparatus, and products for optimizing virtual graphics processing unit utilization.

2. Description of Related Art

In a data center, computers may be grouped together to share a workload. To aid in the distribution of the workload, a component of a computer in the data center may be virtualized or separately partitioned so that multiple applications or entities may use the component without interference from another application or entity. For example, a graphics processing unit (GPU) in one computer may be virtualized into several virtual GPUs, each of which may be assigned to a particular application or virtual machine. How virtualized components, such as virtual GPUs, are distributed to applications or virtual machines impacts the overall efficiency of the data center. There is therefore an ongoing need for improvement in optimizing virtual GPU utilization.

SUMMARY OF THE INVENTION

Methods, systems, and computer program products are provided for optimizing virtual graphics processing unit utilization. Embodiments include assigning a computing intensity level to each virtual machine of a plurality of virtual machines; assigning a priority level to each virtual machine of the plurality of virtual machines; determining for each server of a plurality of servers whether the server includes a virtual graphics processing unit (VGPU) that is available to perform compute intensive tasks for the plurality of virtual machines; and assigning one or more VGPUs to a virtual machine of the plurality of virtual machines in dependence upon the computing intensity level and the priority level of the virtual machine and the number of VGPUs available to perform the compute intensive tasks.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
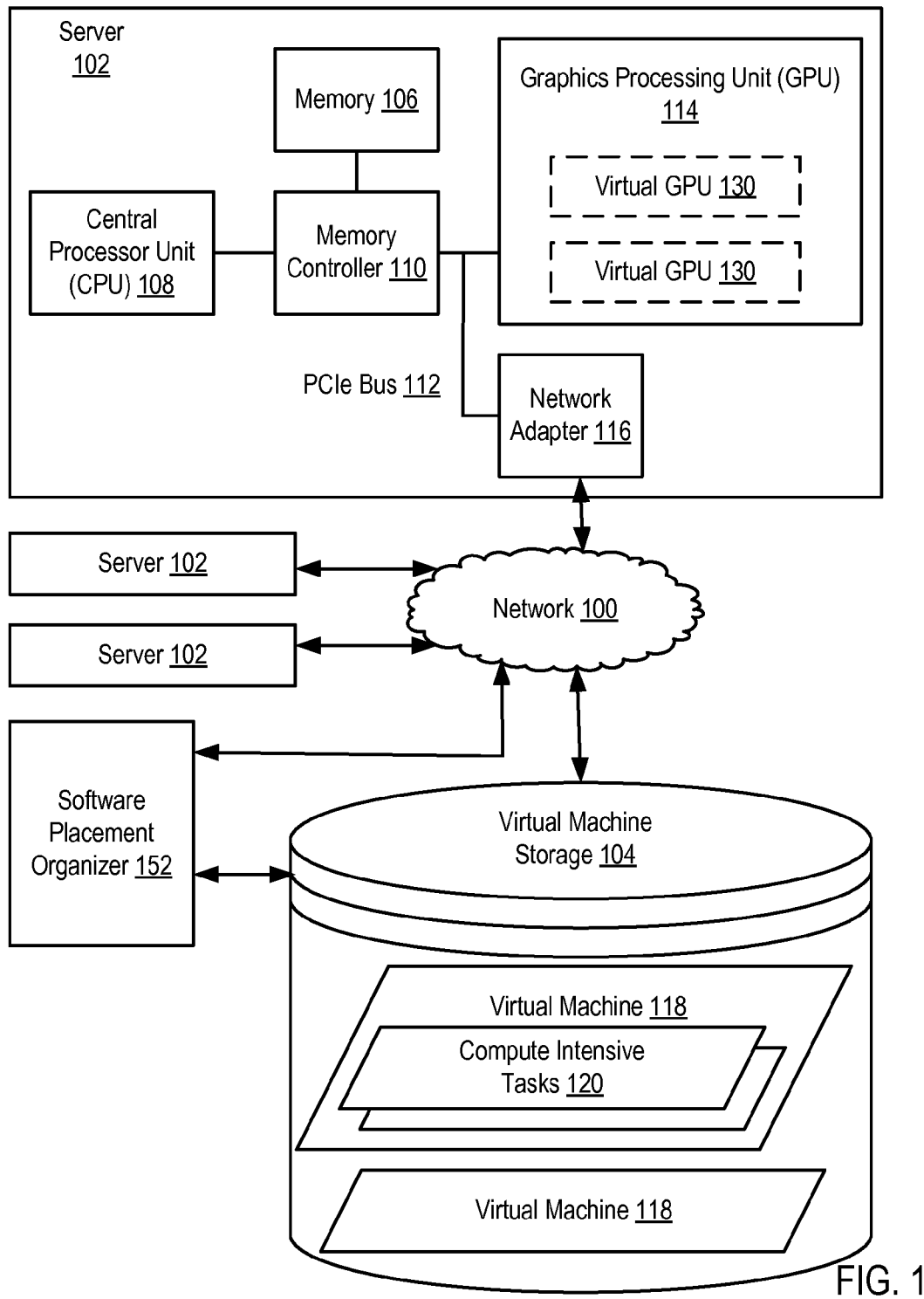
FIG. 1 sets forth a network diagram of a system for optimizing virtual graphics processing unit utilization according to embodiments of the present invention.

Exemplary methods, apparatus, and products for optimizing virtual graphics processing unit utilization in accordance with the present invention are described with reference to the accompanying drawings, beginning with FIG. 1. FIG. 1 sets forth a network diagram of a system for optimizing virtual graphics processing unit utilization according to embodiments of the present invention. The system of FIG. 1 may be implemented in a data center. A data center is a centralized repository, either physical or virtual, for the storage, management, and dissemination of data and information typically organized around a particular subject or pertaining to a particular business. A data center may exist within an organization's facilities or may be maintained as a specialized facility. Data centers vary in size from buildings of servers to server rooms to even computer closets.

The system of FIG. 1 includes a plurality of servers (102) that are each coupled to a software placement organizer (152) and a virtual machine storage (104) through a network (100). The plurality of servers (102) may be implemented as a computer cluster. A computer cluster is a group of linked computers working together closely. The components of a cluster are commonly, but not always, connected to each other through fast local area networks, such as the network (100). Clusters are usually deployed to improve performance and availability over that of a single computer, while typically being much more cost-effective than single computers of comparable speed or availability. A computer cluster may be used in high-performance computing (HPC) to solve advanced computation problems. For example, a computer cluster may be used to perform double precision calculations. Double precision is a computer numbering format that occupies two adjacent storage locations in computer memory. A double precision number, sometimes simply called a double, may be defined to be an integer, fixed point, or floating point.

FIG. 1 illustrates an example architecture for the servers (102). Each server (102) of FIG. 1 includes a central processing unit (CPU) (108), a memory (106), a memory controller (110) coupled to a network adapter (116) and a graphic processing unit (GPU) (114) through a high-speed, high-bandwidth bus, such as a peripheral component interconnect express (PCI-e) bus (112).

The GPU (114) of FIG. 1 is a specialized microprocessor that offloads and accelerates 3D or 2D graphics rendering from the CPU (108). Graphics processing units are used in embedded systems, mobile phones, personal computers, workstations, and game consoles. Modern GPUs are very efficient at manipulating computer graphics, and their highly parallel structure makes them more effective than general-purpose CPUs for a range of complex algorithms. In a personal computer, a GPU can be present on a video card, or it can be embedded on the motherboard. The GPU (114) of FIG. 1 may be implemented with hardware circuitry for rendering digital image information stored in the memory (106).

In order to aid in assignment of tasks to be performed by the server (102), each component of the server (102) may be virtualized. Virtualization is fundamentally about enabling many virtual instances of one physical entity and then using that abstraction to deliver secure isolation, resource management, virtual machine portability, and many other features enabled by insulating the guest form physical hardware dependencies. Machine virtualization multiplexes physical hardware by presenting each virtual machine with a virtual device and combining their respective operations in a hypervisor platform in a way that utilizes native hardware while preserving the illusion that each guest has a complete stand-alone device.

A virtualized machine provides several advantages over a non-virtualized machine. For example, in a virtualized machine, multiple operating systems can run on the same server, eliminating the need to dedicate a single machine to one application. Another advantage is that a virtualized machine can host numerous versions of an operating system, allowing developers to test their programs in different operating system environments on the same machine. Virtual machines, each with their own operating system and applications, function like self-contained packages that are said to be "decoupled from the hardware." Each virtual machine includes at least one instance of an application. It is relatively easy to move a virtual machine from one server to another to balance the workload, to migrate to faster hardware, as well as to recover from hardware failure. Virtual machines can also be quickly cloned and deployed. An increasing trend is to store a user's desktop (OS and applications) in a separate virtual machine in a server and use a dedicated terminal as a "thin client" to the server. Each user is isolated from all other users, due to the virtual machine technology, and the maintenance of the applications is shifted from each user's office to a data center.

Virtualization of the hardware components of the server (102) may be achieved by software executing on the server (102). For example, software (not pictured), such as a virtual machine control program called a "virtual machine monitor" (VMM) or hypervisor platform, running on the server (102) may form virtual CPUs, virtual memories and virtual GPUs (130). The virtualized hardware components of the servers (102) may be grouped together and assigned to form a virtual machine (118).

The virtual machine storage (104) of FIG. 1 stores virtual machines (118). Each virtual machine (118) may be considered a "machine within the machine." An operating system in each virtual machine (118) may be called a "guest operating system," and it may communicate with the hardware of the server (102) via the hypervisor platform executing on the server (102). A virtual machine (118) may include compute intensive tasks (120), such as double precision calculations or video graphics rendering tasks. Virtual machines (118) that include compute intensive tasks (120) may be best performed by a server (102) that includes a graphics processing unit (114).

The software placement organizer (152) of FIG. 1 determines which virtual machines (118) include compute intensive tasks and whether those identified virtual machines (118) are to be performed by a graphics processing unit (114). For example, the software placement organizer (152) may determine which virtual GPU (130) should be assigned to a particular virtual machine (118). To optimize virtual GPU utilization, the software placement organizer (152) of FIG. 1 includes computer program instructions that are capable of assigning a computing intensity level to each virtual machine of a plurality of virtual machines; assigning a priority level to each virtual machine of the plurality of virtual machines; determining for each server of a plurality of servers whether the server includes a virtual graphics processing unit (VGPU) that is available to perform compute intensive tasks for the plurality of virtual machines; and assigning one or more VGPUs to a virtual machine of the plurality of virtual machines in dependence upon the computing intensity level and the priority level of the virtual machine and the number of VGPUs available to perform the compute intensive tasks. Assigning a VGPU to a virtual machine includes moving the virtual Machine (118) and the compute intensive task (120) to a physical server (102). The software entities are loaded locally into the memory (106) of the server (102) and the compute intensive task (120) are executed by the GPU (114).

The software placement organizer (152) of FIG. 1 may also include computer program instructions that are capable of assigning a virtual machine (118) that includes a client operating system a higher priority level than a virtual machine that includes a server operating system. The software placement organizer (152) of FIG. 1 may also include computer program instructions that are capable of selecting a virtual machine with a priority level above a predetermined threshold and compute intensity below a predetermined threshold and preferentially assigning a VGPU to the selected virtual machine.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. As will be appreciated to one of skill in the art, each server (102) may include other buses, devices, and subsystems as desired, such as caches, modems, parallel or serial interfaces, SCSI interfaces, etc. Various embodiments of the present invention may be implemented on a variety of hardware platforms in addition to those illustrated in FIG. 1.

Optimizing graphics processing unit utilization in accordance with the present invention is generally implemented with computers, that is, with automated computing machinery. In the system of FIG. 1, for example, the software placement organizer (152) is implemented to some extent at least as a computer. For further explanation, therefore, FIG. 2 sets forth a block diagram of automated computing machinery comprising an exemplary software placement organizer (152) useful in optimizing graphics processing unit utilization according to embodiments of the present invention. The software placement organizer (152) of FIG. 2 includes at least one computer processor (156) or 'CPU' as well as random access memory (168) ('RAM') which is connected through a high speed memory bus (166) and bus adapter (158) to processor (156) and to other components of the software placement organizer (152).

Stored in RAM (168) is a virtual graphics processing unit utilization optimizer (190), a module of computer program instructions for optimizing virtual graphics processing unit utilization. The software placement organizer (152) of FIG. 2 includes computer program instructions that are capable of assigning a computing intensity level to each virtual machine of a plurality of virtual machines; assigning a priority level to each virtual machine of the plurality of virtual machines; determining for each server of a plurality of servers whether the server includes a virtual graphics processing unit (VGPU) that is available to perform compute intensive tasks for the plurality of virtual machines; and assigning one or more VGPUs to a virtual machine of the plurality of virtual machines in dependence upon the computing intensity level and the priority level of the virtual machine and the number of VGPUs available to perform the compute intensive tasks.

Also stored in RAM (168) is an operating system (154). Operating systems useful optimizing graphics processing unit utilization according to embodiments of the present invention include UNIX™, Linux™, Microsoft XP™, AIX™, IBM's i5/OS™, and others as will occur to those of skill in the art. The operating system (154) and the virtual graphics processing unit utilization optimizer (190) in the example of FIG. 2 are shown in RAM (168), but many components of such software typically are stored in non-volatile memory also, such as, for example, on a disk drive (170).

Figure 2:
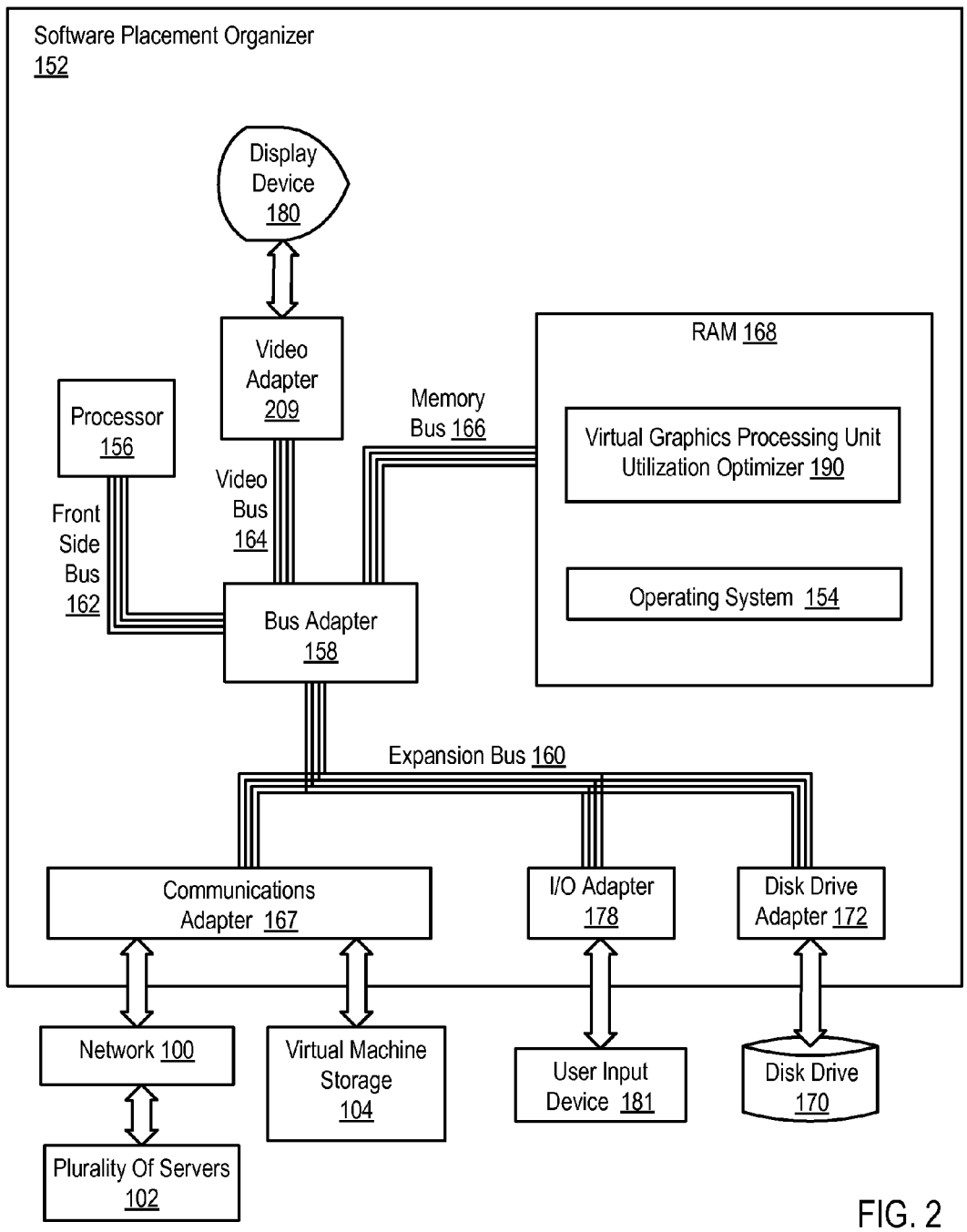
FIG. 2 sets forth a block diagram of automated computing machinery comprising an exemplary software placement organizer useful in optimizing graphics processing unit utilization according to embodiments of the present invention.

The software placement organizer (152) of FIG. 2 includes disk drive adapter (172) coupled through expansion bus (160) and bus adapter (158) to processor (156) and other components of the software placement organizer (152). Disk drive adapter (172) connects non-volatile data storage to the software placement organizer (152) in the form of disk drive (170). Disk drive adapters useful in computers for optimizing graphics processing unit utilization according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example software placement organizer (152) of FIG. 2 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example software placement organizer (152) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary software placement organizer (152) of FIG. 2 includes a communications adapter (167) for data communications with the plurality of servers (102) through the network (100) and for data communications with the virtual machine storage (104). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for optimizing graphical processing unit utilization according to embodiments of the present invention include modems for wired dial-up communications, Ethernet (IEEE 802.3) adapters for wired data communications network communications, and 802.11 adapters for wireless data communications network communications.

Figure 3:
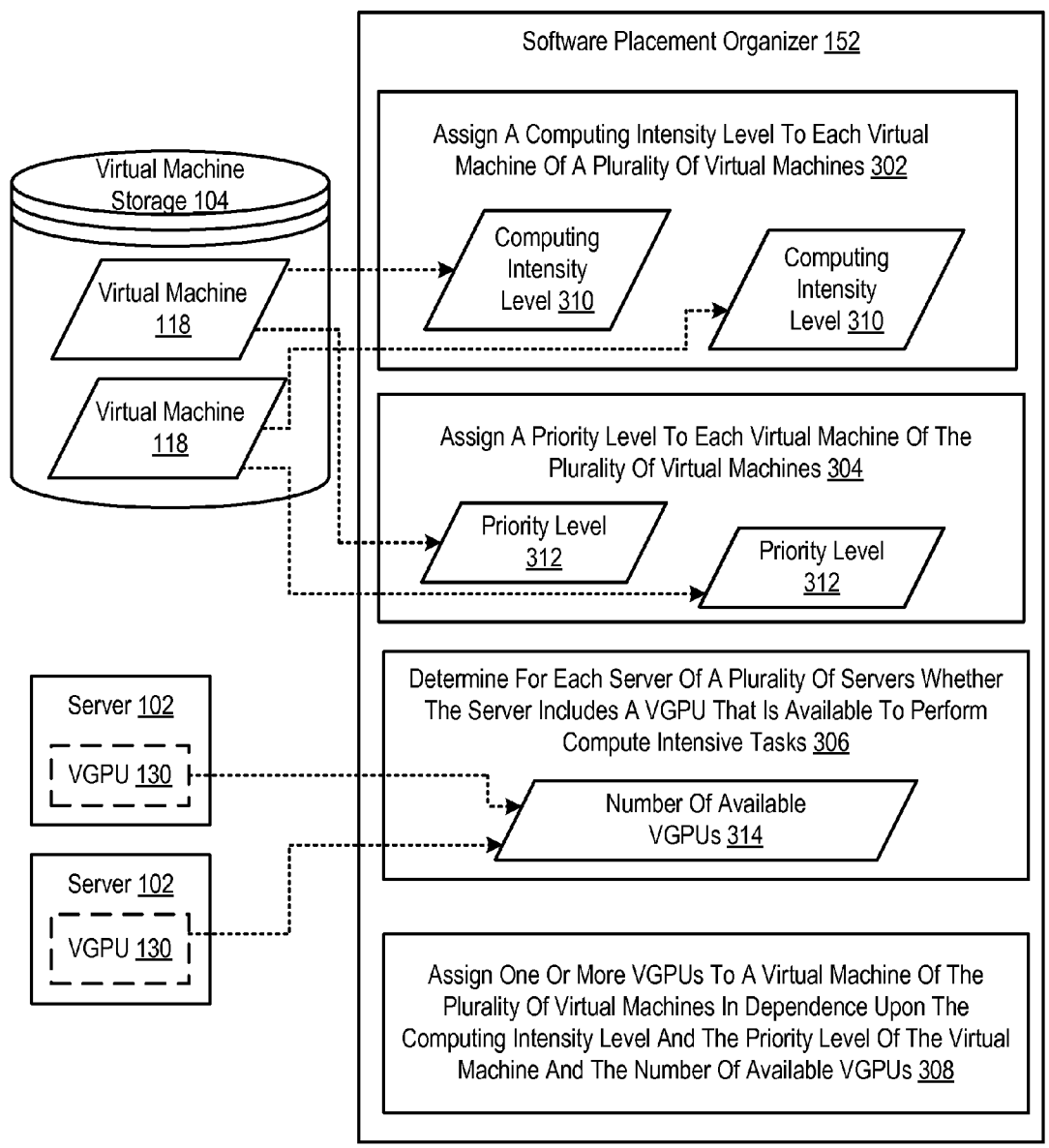
FIG. 3 sets forth a flow chart illustrating an exemplary method for optimizing graphics processing unit utilization according to embodiments of the present invention.

For further explanation, FIG. 3 sets forth a flow chart illustrating an exemplary method for optimizing graphics processing unit utilization according to embodiments of the present invention. The method of FIG. 3 includes assigning (302) a computing intensity level (310) to each virtual machine (118) of a plurality of virtual machines. Assigning the computing intensity level (310) to a virtual machine (118) may be carried out by comparing compute tasks of a particular virtual machine (118) to compute tasks of the other virtual machines (118) and assigning the virtual machine (118) with the most compute intensive tasks the highest computing intensity level (310). For example, a virtual machine (118) that includes an application that requires high resolution graphics, such as a computer aided design (CAD) program, may be assigned a higher computing intensity level (310) over a virtual machine (118) that does not include compute intensive tasks.

The method of FIG. 3 includes assigning (304) a priority level (312) to each virtual machine (118) of the plurality of virtual machines. Assigning (304) a priority level (312) to each virtual machine (118) of the plurality of virtual machines may be carried out by determining an importance of workloads of virtual machines (118), comparing the importance of the workloads, and assigning the virtual machine (118) with the most important workload the highest priority level (312). Assigning (304) a priority level (312) to a virtual machine (118) may be carried out by the software placement organizer (152) as described above.

The method of FIG. 3 includes determining (306) for each server (102) of a plurality of servers whether the server (102) includes a virtual graphics processing unit (VGPU) (130) that is available to perform compute intensive tasks for the plurality of virtual machines (118). Determining (306) whether a server (102) includes a VGPU (130) that is available to perform compute intensive tasks is carried out by receiving information from the server (102) indicating resources available at the server (102), examining the indicated resources for a VGPU (130), and determining the workload of the identified VGPU (130).

The method of FIG. 3 includes assigning (308) one or more VGPUs (130) to a virtual machine (118) of the plurality of virtual machines in dependence upon the computing intensity level (310) and the priority level (312) of the virtual machine (118) and the number of VGPUs (130) available to perform the compute intensive tasks. Assigning (308) a VGPU (130) to a virtual machine (118) may be carried out by determining which virtual machine (118) to associate with a VGPU (130) and transmitting the virtual machine (118) to the server (102) that includes the VGPU (130) that is available.

In view of the explanations set forth above, readers will recognize that the benefits of optimizing graphics processing unit utilization according to embodiments of the present invention include delivering increased video performance for virtual machines running client operating systems or other workloads that exploit and leverage a graphics processing unit (GPU). In addition, optimizing placement against the priority level may ensure that higher business priority workloads get the resources during critical time periods. This function enables configuration of virtual machines and virtual GPUs to match set business goals.

Exemplary embodiments of the present invention are described largely in the context of a fully functional computer system for optimizing graphics processing unit utilization. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:

assigning, in dependence upon a comparison between compute tasks of each virtual machine of a plurality of virtual machines to compute tasks of other virtual machines of the plurality of virtual machines, a computing intensity level to each virtual machine of the plurality of virtual machines, wherein one or more virtual machines with least compute intensive tasks are assigned a lowest computing intensity level;

assigning a priority level to each virtual machine of the plurality of virtual machines including assigning a virtual machine that includes a client operating system a higher priority level than a virtual machine that includes a server operating system;

prior to moving each of the plurality of virtual machines to a server for execution, determining that each of a plurality of servers includes a virtual graphics processing unit (VGPU) that is available to perform compute intensive tasks for the plurality of virtual machines, wherein determining that each of the plurality of servers includes a VGPU further comprises receiving, from each the plurality of servers, information indicating resources available at the server and examining the indicated resources for a VGPU; and assigning one of the VGPUs of the plurality of servers to a virtual machine of the plurality of virtual machines in dependence upon the computing intensity level and the priority level of the virtual machine and the number of VGPUs available to perform the compute intensive tasks, including selecting a virtual machine with a priority level above a predetermined threshold and compute intensity below a predetermined threshold.

2. The method of claim 1, wherein at least one of the virtual machines includes an application with compute intensive tasks.

3. The method of claim 1, wherein a priority level of a particular virtual machine indicates an importance of a workload of the particular virtual machine.

4. The method of claim 1, further comprising preferentially assigning a VGPU to the selected virtual machine.

5. The method of claim 4, wherein preferentially assigning the VGPU to the selected virtual machine includes preferentially assigning the VGPU to a virtual machine with a highest priority and the lowest computing intensity level.

6. The method of claim 1, wherein the VGPUs are assigned in further dependence upon the CPU speed and memory size of the plurality of servers.

7. The method of claim 1, wherein each virtual machine includes at least one instance of an application.

8. The method of claim 1, wherein determining that each of a plurality of servers includes a virtual graphics processing unit (VGPU) that is available to perform compute intensive tasks for the plurality of virtual machines includes: receiving information from a server indicating resources available at the server, examining the indicated resources for a VGPU at the server, and determining workload of the VGPU.

* * * * *